(12) United States Patent
Perrizo et al.

(10) Patent No.: US 7,836,090 B2
(45) Date of Patent: Nov. 16, 2010

(54) METHOD AND SYSTEM FOR DATA MINING OF VERY LARGE SPATIAL DATASETS USING VERTICAL SET INNER PRODUCTS

(75) Inventors: William K. Perrizo, Fargo, ND (US); Taufik Fuadi Abidin, Piscataway, NJ (US); Amal Shehan Perera, Knoxville, TN (US); Masum Serazi, Edison, NJ (US)

(73) Assignee: NDSU Research Foundation, Fargo, ND (US)

( * ) Notice: Subject to any disclaimer, the term of this patent is extended or adjusted under 35 U.S.C. 154(b) by 631 days.

(21) Appl. No.: 11/791,004

(22) PCT Filed: Nov. 17, 2005

(86) PCT No.: PCT/US2005/042101
§ 371 (c)(1),
(2), (4) Date: Aug. 28, 2007

(87) PCT Pub. No.: WO2006/055894
PCT Pub. Date: May 26, 2006

(65) Prior Publication Data
US 2008/0109437 A1    May 8, 2008

Related U.S. Application Data

(60) Provisional application No. 60/628,580, filed on Nov. 17, 2004.

(51) Int. Cl.
*G06F 7/00* (2006.01)
*G06F 17/30* (2006.01)

(52) U.S. Cl. .................................................... 707/797

(58) Field of Classification Search ................ 707/102, 707/790, 791, 797
See application file for complete search history.

(56) References Cited

U.S. PATENT DOCUMENTS

| 5,715,455 | A | 2/1998 | Macon, Jr. et al. |
| 5,960,437 | A | 9/1999 | Krawchuk et al. |
| 5,987,468 | A | 11/1999 | Singh et al. |

(Continued)

OTHER PUBLICATIONS

Ren, Dongmei; Rahal, Imad; Perrizo, William; and Scott, Kirk. "A Vertical Distance-based Outlier Detection Method with Local Pruning", Proceedings from CIKM '04, Nov. 8-13, 2004, Washington DC, USA, pp. 279-284, pp. 6.*

(Continued)

*Primary Examiner*—James Trujillo
*Assistant Examiner*—Marc Somers
(74) *Attorney, Agent, or Firm*—Patterson Thuente Christensen Pedersen, P.A.

(57) ABSTRACT

A system and method for performing and accelerating cluster analysis of large data sets is presented. The data set is formatted into binary bit Sequential (bSQ) format and then structured into a Peano Count tree (P-tree) format which represents a lossless tree representation of the original data. A P-tree algebra is defined and used to formulate a vertical set inner product (VSIP) technique that can be used to efficiently and scalably measure the mean value and total variation of a set about a fixed point in the large dataset. The set can be any projected subspace of any vector space, including oblique sub spaces. The VSIPs are used to determine the closeness of a point to a set of points in the large dataset making the VSIPs very useful in classification, clustering and outlier detection. One advantage is that the number of centroids (k) need not be pre-specified but are effectively determined. The high quality of the centroids makes them useful in partitioning clustering methods such as the k-means and the k-medoids clustering. The present invention also identifies the outliers.

18 Claims, 6 Drawing Sheets

U.S. PATENT DOCUMENTS

| | | | |
|---|---|---|---|
| 6,185,561 | B1 | 2/2001 | Balaban et al. |
| 6,941,303 | B2 | 9/2005 | Perrizo |
| 6,941,318 | B1 | 9/2005 | Tamayo et al. |
| 6,952,499 | B1 | 10/2005 | Vititoe |
| 2003/0208488 | A1 | 11/2003 | Perrizo |
| 2005/0163384 | A1 | 7/2005 | Avni et al. |
| 2005/0171700 | A1 | 8/2005 | Dean |
| 2008/0281764 | A1 | 11/2008 | Baxter |
| 2008/0312513 | A1 | 12/2008 | Simon et al. |

OTHER PUBLICATIONS

Ding, Qiang; Ding, Qin; and Perrizo, William. "Decision Tree Classification of Spatial Data Streams Using Peano Count Trees", Proceedings from SAC 2002, Madrid, Spain, pp. 413-417, pp. 5.*

Ding, Qin; Khan, Maleq; Roy, Amalendu; and Perrizo, William. "The P-Tree Algebra", Proceedings from SAC 2002, Madrid, Spain, pp. 426-431, pp. 6.*

Wang, Baoying; Pan, Fei; Ren, Dongmei; Cui, Yue; Ding, Qiang; and Perrizo, William. "Efficient OLAP Operations for Spatial Data Using Peano Trees", Proceedings from DMKD' 03, Jun. 13, 2003, San Diego, CA, USA, pp. 28-34, pp. 7.*

Abidin, Taufik; Perera, Amal; Serazi, Masum; and Perrizo, William. "Vertical Set Square Distance: A Fast and Scalable Technique to Compute Total Variation in Large Datasets", Mar. 16-18, 2005, pp. 60-65, pp. 6.*

"Fast Algorithms for Mining Association Rules," R. Agrawal, R. Srikant, Proceedings of the International Conference on VLDB, Santiago, Chile, 13 pgs., Sep. 1994.

"Mining Quantitative Association Rules in Large Relational Tables," R. Srikant, R. Agrawal, ACM-SIGMOD 96, Montreal, Canada, pp. 1-12, Jun. 1996.

"An Effective Hash-Based Algorithm for Mining Association Rules," J.S. Park, M.S. Chen, P.S. Yu, ACM-SIGMOD 95, California, pp. 175-186, 1995.

"Multidimensional Access Methods," V. Gaede, O. Gunther, ACM Computing Surveys, vol. 30, No. 2, pp. 171-231, Jun. 1998.

"The Quadtree and Related Hierarchical Data Structure," H. Samet, ACM Computing Survey, vol. 16, No. 2, pp. 188-260, Jun. 1984.

Web site print-out: "What are HH-codes and how can they be used to store hydrographic data?," H. Iverson, Norwegian Hyrdorgraphic Service (NHS), http://www.statkart.no/nlhdb/iveher/hhtext.htm, 7 pgs., Jan. 1998.

"Run-Length Encodings," S.W. Golomb, IEEE Trans. On Information Theory, vol. 12, No. 3, pp. 399-401, Jul. 1966.

"Spatial Data Mining: A Database Approach," M. Ester, H-P. Kriegel, J. Sander, Proceedings of the Fifth International Symposium on Large Spatial Databases (SSD), Berlin, Germany, 20 pgs., 1997.

"Spatial Data Mining: Progress and Challenges Survey Paper," K. Koperski, J. Adhikary, J. Han, Data Mining and Knowledge Discovery, 16 pgs., 1996.

"Spatial Data Mining: Database Primitives, Algorithms and Efficient DBMS Support," M. Ester, A. Frommelt, H-P. Kriegel, J. Sander, Data Mining and Knowledge Discovery, 28 pgs., 1999.

"Discovery of Spatial Association Rules in Geographic Information Databases," K. Koperski, J. Han, SSD, 20 pgs., 1995.

Web site print-out: SMILEY (Spatial Miner & Interface Language for Earth Yield), Database Systems Users & Research Group at NDSU (DataSURG) http://www.midas.cs.ndsu.nodak.edu/~smiley, 5 pgs., undated.

"Growing Decision Trees on Support-Less Association Rules," K. Wang S. Zhou, Y. He, 6th ACM SIGKDD International Conference on Knowledge Discovery & Data Mining, Boston, Massachusetts, 5 pgs., Aug. 2000.

"An Interval Classifier for Database Mining Applications," R. Agrawal, S. Ghosh, T. Imielinski, B. Iyer, A. Swami, 18th International Conference on Very Large Data Bases, Vancouver, Canada, 14 pgs., Aug. 1992.

"SPRINT: A Scalable Parallel Classifier for Data Mining," J. Shafer, R. Agrawal, M. Mehta, 22nd International Conference on Very Large Data Bases, Bombay, India, pp. 544-555, Sep. 1996.

"Fast Approach for Association Rule Mining for Remotely Sensed Imagery," Q. Zhou, Q. Ding, W. Perrizo, Proceedings of the ISCA International Conference on Computers and Their Applications, New Orleans, Louisiana, 4 pgs., Mar. 2000.

"Efficient and Effective Clustering Method for Spatial Data Mining," R. Ng, J. Han, Proceedings of the 20th International Conference on Very Large Data Bases, Santiago, Chile, 12 pgs., Sep. 1994.

"Data Mining: An Overview from a Database Perspective," M.S. Chen, J. Han, P.S. Yu, IEEE Transactions on Knowledge and Data Engineering, vol. 8, No. 6, pp. 1-40, Dec. 1996.

"Mining Association Rules Between Sets of Items in Large Database," R. Agrawal, T. Imielinski, A. Swami, ACM-SIGMOD 93, Washington, D.C., pp. 207-216, May 1993.

"Quad Trees: A Data Structure for Retrieval of Composite Keys," R.A. Finkel, J.L. Bentley, ACTA Informatica, vol. 4, pp. 1-9, 1974.

"Mining Frequent Patterns Without Candidate Generation," J. Han, J. Pei, Y. Yin, ACM-SIGMOD 2000, Dallas, Texas, pp. 1-12, May 2000.

"The Application of Association Rule Mining on Remotely Sensed Data," J. Dong, W. Perrizo, Q. Ding, J. Zhou, Proceedings of ACM Symposium on Applied Computers, Italy, 6 pgs., Mar. 2000.

"Finding Interesting Associations Without Support Pruning," E. Cohen, M. Datar, S. Fujiwara, A. Gionis, P. Indyk, R. Motwani, J. Ullman, C. Yang, Proceedings of 26th International Conference on Very Large Data Bases, Cairo, Egypt, 12 pgs., Sep. 2000.

"Integrating Classification and Association Rule Mining," B. Liu, W. Hsu, Y. Ma, The Fourth International Conference on Knowledge Discovery and Data Mining, New York, New York, 7 pgs., Aug. 1998.

"Inferring Decision Trees Using the Minimum Description Length Principle," J.R. Quinlan, R.L. Rivest, Information and Computation, Academic Press, Inc., vol. 80, pp. 227-248, 1989.

"Automatic Subspace Clustering of High Dimensional Data for Data Mining Application," R. Agrawal, J. Cehrke, D. Gunopulos, P. Raghavan, Proceedings of ACM SIGMOD International Conference on Management of Data, Seattle, Washington, 12 pgs., Jun. 1998.

"Constraint-Based Clustering in Large Databases," A.K.H. Tung, J. Han, L.V.S. Lakshmanan, R.T. Ng, The 8th International Conference on Database Theory, London, United Kingdom, 15 pgs., Jan. 2001.

"Fast Vertical Mining Using Diffsets," Mohammed J. Zaki, Karam Gouda, Special Interest Group in Knowledge discovery and Data Mining (SIGKDD), Washington DC, 21 pgs, Aug. 2003.

"Request Order Linked List (ROLL): A Concurrency Control Object for Centralized and Distributed Database Systems," William Perrizo, Proceedings of IEEE International Conference on Data Engineering, Kobe, Japan, pp. 278-285, Apr. 11, 1991.

"Parameter Optimized, Vertical, Nearest-Neighbor-Vote and Boundary-Based Classification," William Perrizo, Amal Perera, 7 pgs., undated.

"Turbo charging Vertical Mining of Large Databases," Pradeeo Shenoy, Gaurav Bhalotia, Jayant R. Haritsa, Mayank Bawa, S. Sudarshan, Devavrat Shah, ACM SIGMOD Record, vol. 29, Issue 2, pp. 22-33, 2000.

"PINE—Podium Incremental Neighbor Evaluator for Classifying Spatial Data", William Perrizo, Qin Ding, Anne Denton, Kirk Scott, Qiang Ding, Maleq Khan, 5 pgs., undated.

Web site print-out: "Multiplication of Numbers", http://www.cut-the-knot.org/do_you_know/mul_num.shtml, Apr. 11, 2001.

"Deriving high confidence rules from spatial data using Peano Count Trees", William Perrizo, Qin Ding, Qiang Ding, Amalendu Roy, Advances in Web-Age Information Management, Second International Conference, 12 pgs., 2001.

Web site print-out: "Plane Filling Curves", http://www.cut-the-knot.org/do_you_know/hilbert.shtml, Apr. 11, 2001.

"CHARM: An efficient algorithm for closed association rule mining", M.J. Zaki, C.J. Hsiao, Technical Report 99-10, Computer Science Dept., Rensselaer Polytechnic Institute, Oct. 1999.

"Scalable algorithms for association mining", M.J. Zaki, IEEE Transactions on Knowledge and Data Engineering, 12(3), pp. 372-390, May-Jun. 2000.

"Integrating association rule mining with databases: alternatives and implications", S. Sarawagi, S. Thomas, R. Agrawal, ACM SIGMOD Intl. Conf. Management of Data, Jun. 1998.

"*Data organization and access for efficient data mining*", B. Dunkel, N. Soparkar, 15th IEEE Intl. Conf. on Data Engineering, Mar. 1999.

"*Practical C++ Programming*", Steve Oualline, O'Reilly & Associates, Inc., (Aug. 1995).

"*K-Nearest Neighbor Classification on Spatial Data Streams Using P-Trees*", Maleq Khan, Qin Ding, William Perrizo, 6th Pacific-Asia Konwledge Discovery and Data-mining Conference PAKDD, Taipei, Taiwan, pp. 517-528, May 2002.

"*Brute-Force Mining of High-Confidence Classification Rules*", Roberto J. Bayardo Jr., Proc. Of the Third Int'l Conf. on Knowledge Discovery & Data Mining, pp. 123-126, 1997.

Web site print-out: "*Augmenting Data Structures*", Note Taker: Srivani Adathakula, Sep. 9, 1998.

"*CLARANS: A Method for Clustering Objects for Spatial Data Mining*", Ng et al. IEEE Transactions on Knowledge and Data Engineering vol. 14, No. 5, Sep. 2002.pp. 1003-1016.

U.S. Appl. No. 60/237,778, filed Oct. 4, 2000.

"*Neural Minimal Distance Methods*" Duch. World Congress of Computational Intelligence, May 1998 pp. 1299-1304.

"*Smart TV: A Fast and Scalable Nearest Neighbor Based Classifier on Data Mining*", Abidin et al., 2006. pp. 536-540.

"*Support Vector Machines for Classification and Regression*", Gunn. University of South Hampton, Faculty of Engineering, Science and Mathematics School of Electronics and Computer Science. May 10, 1998. 54 pages.

"*Hyperplane Margin Classifers on the Multinomial Manifold*" Lebanon et al., Appearing in Proceedings of the 21st International Conference on Machine Learning, Banff, Canada 2004.

File wrapper for U.S. Appl. No. 09/957,637, filed Sep. 20, 2001.
File wrapper for U.S. Appl. No. 10/367,644, filed Feb. 14, 2003.
File wrapper for U.S. Appl. No. 11/732,501, filed Apr. 2, 2007.

\* cited by examiner

```
       BAND-1                           BAND-2
  254        127                  37          240
(1111 1110) (0111 1111)       (0010 0101)  (1111 0000)

```
BSQ format (2 files)      BIL format (1 file)     BIP format (1 file)

Band 1: 254 127 14 193    254 127 37 240          254 37 127 240
Band 2: 37 240 200 19     14 193 200 19           14 200 193 19
```

```
bSQ format (16 files)
B11 B12 B13 B14 B15 B16 B17 B18 B21 B22 B23 B24 B25 B26 B27 B28
 1   1   1   1   1   1   0   0   0   1   0   0   1   0   1
 0   1   1   1   1   1   1   1   1   1   1   1   0   0   0   0
 0   0   0   0   1   1   1   0   1   1   0   0   1   0   0   0
 1   1   0   0   0   0   1   0   0   0   1   0   0   1   1
```

FIG. 4

```
1 1  1 1  1 1  0 0                    55                depth=0   level=3
1 1  1 1  1 0  0 0                  / /\ \
1 1  1 1  1 1  0 0              /    /   \     \
1 1  1 1  1 1  1 0           16     8    15    16       depth=1   level=2
1 1  1 1  1 1  1 1                / /|\   /|\
1 1  1 1  1 1  1 1              3  0 4 1 4 4 3 4        depth=2   level=1
1 1  1 1  1 1  1 1              /|\    /|\    /|\
0 1  1 1  1 1  1 1             1110   0010   1101       depth=3   level=0
```

FIG. 5

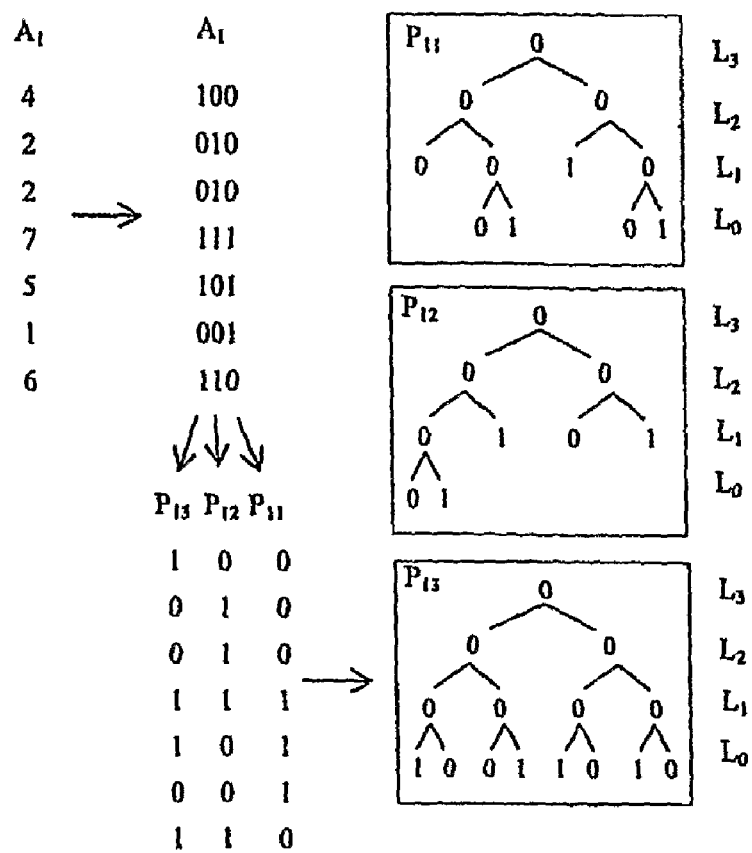
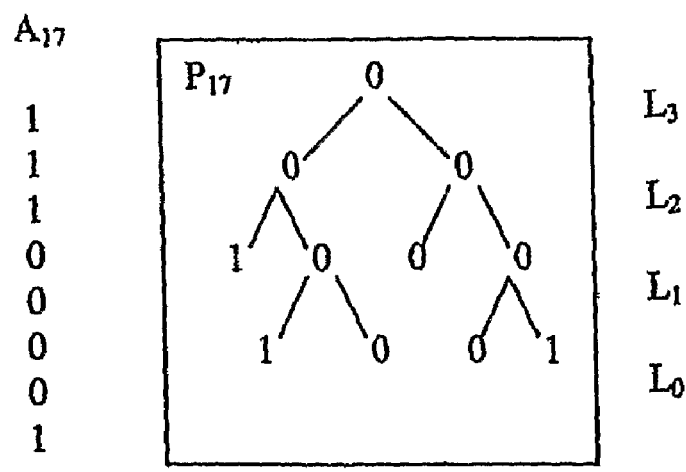
FIG. 7

METHOD AND SYSTEM FOR DATA MINING OF VERY LARGE SPATIAL DATASETS USING VERTICAL SET INNER PRODUCTS

RELATED APPLICATIONS

This application claims priority to PCT Application No. PCT/US2005/042101 filed Nov. 17, 2005, and U.S. Provisional Application No. 60/628,580 filed Nov. 17, 2004, the disclosures of which are incorporated by reference herein in their entireties.

FEDERALLY SPONSORED RESEARCH

This work may have been funded at least in part by GSA Grant No. ACT#K96130308, which may entitle the U.S. government to certain rights to the invention.

FIELD OF THE INVENTION

The present invention is related to accelerating the performance of clustering operations on large data sets and, more particularly, to vector operations on a lossless, data-mining-ready data structure representation of the dataset.

BACKGROUND OF THE INVENTION

Data mining is the use of automated data analysis techniques to uncover previously undetected relationships among data items. The best known examples of data mining applications are in database marketing using techniques such as interactive querying, segmentation, and predictive modeling of a customer database to select potential customers in a more precisely targeted way, in financial investment using predictive modeling techniques to create trading models, select investments, and optimize portfolios, and in production manufacturing wherein production processes are controlled and scheduled to maximize profit.

Data mining has been appropriate for these areas because, while significant amounts of data are present for analysis, the datasets are of a small enough nature that analysis can be performed quickly and efficiently using standard data mining techniques such as association rule mining (ARM), classification, and cluster analysis. This has not been the case with other kinds of datasets. For instance, such areas as bioinformatics where analysis of microarray expression data for DNA is required, nanotechnology where data fusion must be performed, VLSI design where circuits containing millions of transistors must be properly interconnected and tested for accuracy, image analysis of spatial data obtained, for example, from sets of aerial images where data representative of each detailed image can comprise millions of bits, and other kinds of applications that present extremely large datasets where the mining of implicit relationships among the data can be prohibitively time consuming with traditional methods.

The initial problem in establishing data mining techniques for these extremely large datasets is organizing the large amounts of data into an efficiently usable form that facilitates quick computer retrieval, interpretation, and sorting of the entire dataset or subsets thereof. The organizational format of the data should recognize that different bits of data can have different degrees of contribution to value. For example, in some applications high-order bits alone may provide the necessary information for data mining, making the retention of all the bits in a dataset unnecessary for a given analysis. The organizational format should also recognize the need to facilitate the representation of a precision hierarchy. For example, in some applications a band may be well represented by a single bit whereas other applications may require eight bits to be appropriately represented. In addition, the organizational format should recognize the need to facilitate the creation of an efficient, lossless data structure that is data-mining-ready, i.e., a data structure suited for data mining techniques.

Prior art techniques to mine large datasets have largely depended on Clustering and Classification techniques. Clustering attempts to discover and understand the natural structure or group in a data set. [See Baumgartner, C., Plant, C., Kailing, K., Kriegel, H., Kroger, P., (2004) Subspace Selection for Clustering High-Dimensional Data, proceedings of 4th IEEE International Conference on Data Mining]. The goal of clustering is to collect similar objects mutually exclusively and collectively exhaustively, achieving minimal dissimilarity within one cluster and maximal dissimilarity among clusters. [See Han, J., and Kamber, M. (2001), Data Mining: Concepts and Techniques, San Francisco, Calif., Morgan Kaufmann]. Clustering methods, such as partitioning, hierarchical, density-based, grid-based, and model-based methods are well known in the art. [See for example, Bohm, C., Kailing, K., Kriegel, H., Kroger, P., Density Connected Clustering with Local Subspace Preferences, proceedings of 4th IEEE International Conference on Data Mining and Han J. et al. referenced above]. In a partitioning clustering problem for example, the aim is to partition a given set of n points in m dimensional space into k groups, called clusters, so that points within each cluster are near each other.

The most well known partitioning methods are k-means and k-medoids, and their variants. Essentially, given a database of n objects and k, the number of clusters to form, a partitioning technique organizes the objects into k partitions ($k \leq n$), where each partition represents a cluster. The clusters are formed to optimize an objective partitioning criterion, often called a similarity function, such as distance, so that the objects within a cluster are "similar", whereas the objects of different clusters are "dissimilar" in terms of the database attributes.

The process for a conventional k-means technique for partitioning proceeds as follows. First, the process randomly selects k of the objects, which initially each represent a cluster mean or center. For each of the remaining objects, an object is assigned to the cluster to which it is the most similar, based on the distance between the object and the cluster mean. The process then computes the new mean for each cluster. This process iterates until the criterion function converges.

The k-means method, however, can be applied only when the mean of a cluster is defined. Moreover, the k-means method is sensitive to noisy data and outliers since a small number of such data can substantially influence the mean value.

The basic strategy of k-medoids clustering techniques is to find k clusters in n objects by first arbitrarily finding a representative object (the medoid) for each cluster. Each remaining object is clustered with the medoid to which it is the most similar. The strategy then iteratively replaces one of the medoids by one of the non-medoids as long as the quality of the resulting clustering is improved.

Partitioning Around Medoids (PAM) is a variation of the k-medoids clustering technique. PAM attempts to determine k partitions for n objects. After an initial random selection of k-medoids, the technique repeatedly tries to make a better choice of medoids. All of the possible pairs of objects are analyzed, where one object in each pair is considered a medoid, and the other is not. Experimental results show that PAM works satisfactorily for small data sets; however, PAM is not efficient in dealing with medium and large data sets.

Clustering Large Applications (CLARA) and Clustering Large Applications based on Randomized Search (CLAR-ANS) are further refinements to the PAM technique. Instead of finding representative objects for the entire data set, CLARA draws a sample of the data set, applies PAM on the sample, and finds the medoids of the sample. Unfortunately, a good clustering based on samples will not necessarily represent a good clustering of the whole data set if the sample is biased. As such, CLARANS was proposed which does not confine itself to any sample at any given time. The CLARANS technique draws a sample with some randomness in each step of the search.

These CLARA and CLARANS methods are successful when the clusters are compact clouds that are rather well separated from one another. However, these approaches have three main shortcomings. The first shortcoming is the necessity for users to specify k, the number of clusters, in advance, which is not applicable for many real applications because users may have no prior knowledge of the distribution of the datasets. The second disadvantage is that the computation complexity of the methods are represented by the function O (nkt), where n is the number of objects, k is the number of clusters, and t is the number of iterations, thus, these methods are not efficient and scalable for large datasets (where n is large). The third shortcoming is that the initial points are chosen randomly. In the case of random selection, if the points selected are far away from the mean or the real centroid points, both the quality of the clusters and efficiency of the process deteriorate significantly (where t is large).

Accordingly, it would be desirable to develop methods and techniques for data mining that were more applicable and efficient for use with large and very large datasets.

SUMMARY OF THE INVENTION

The needs described above are in large part met by the system and method of the present invention. The dataset subject to cluster analysis is preferably in the form of a relational table R of n tuples, each tuple having at least one numeric attribute and a class label of a class to which the tuple belongs. The present invention, preferably implemented by a computer program executed on a high speed or parallel cluster of high speed computers, operates to create one file for each bit position of each attribute of the data while maintaining the bit position identification and to store the data with the corresponding bit position identification from the binary data within the created filed.

Once this bit-sequential format of the data is achieved, the formatted data can be structured into a tree format that is data-mining-ready. The formatted data is structured by dividing each of the files containing the binary data into quadrants according to the bit position identification and recording the count of 1-bits for each quadrant on a first level. Then, recursively dividing each of the quadrants into further quadrants and recording the count of 1-bits for each quadrant until all quadrants comprise a pure-1 quadrant or a pure-0 quadrant to form a basic tree structure. This structure is similar to other quadrant tree structures but for individual bit positions within values rather than the values themselves.

The basic tree structure is then operated on with algebraic techniques including the vector set inner product to compute a total variation of a set of points about a point. In an alternate embodiment, the present invention computes a vector set inner product of vector difference that primarily measures a total variation of a set of vectors in a set about a center vector. A computer readable and executable set of instructions is provided that use the algebraic techniques to iteratively construct a tabulation containing a ranked list of high-quality k's (or centroids) that can be used to cluster the dataset. The ranked list also identifies the outliers. The vector operations involve computations that can done once upon a set of points and then repeatedly used during the remainder of the cluster analysis operations thereby significantly speeding up the computation. The technology disclosed herein is fast, accurate and scales to very large data sets unlike prior art techniques.

The system and method of the present invention is especially suited to data mining of large datasets such as spatial datasets representing remote sensed imagery (RSI), bioinformatic datasets, nanotechnology datasets, and datasets representing integrated circuits.

BRIEF DESCRIPTION OF THE DRAWINGS

FIG. 2 is an illustrative example of a scene described by only two data bands having only two rows and two columns (both decimal and binary representations are shown).

FIG. 3 displays the BSQ, BIL, BIP and bSQ formats for the data of FIG. 2.

FIG. 4 depicts bSQ formats for the data of FIG. 2.

FIG. 5 depicts an 8-row-by-8-column image and its corresponding PC-tree representation.

FIG. 6 illustrates the decomposition of a numeric value of an attribute into a vertical bit vector and 1-dimensional P-tree according to a general embodiment of the present invention.

FIG. 7 illustrates a P-tree of an attribute A17.

FIGS. 11(a) and 11(b) illustrate the operation of P-tree logical AND and OR.

FIG. 12 is an illustration of a set of vectors from the same class differ to a.

DETAILED DESCRIPTION OF THE PREFERRED EMBODIMENTS

Figure 1:
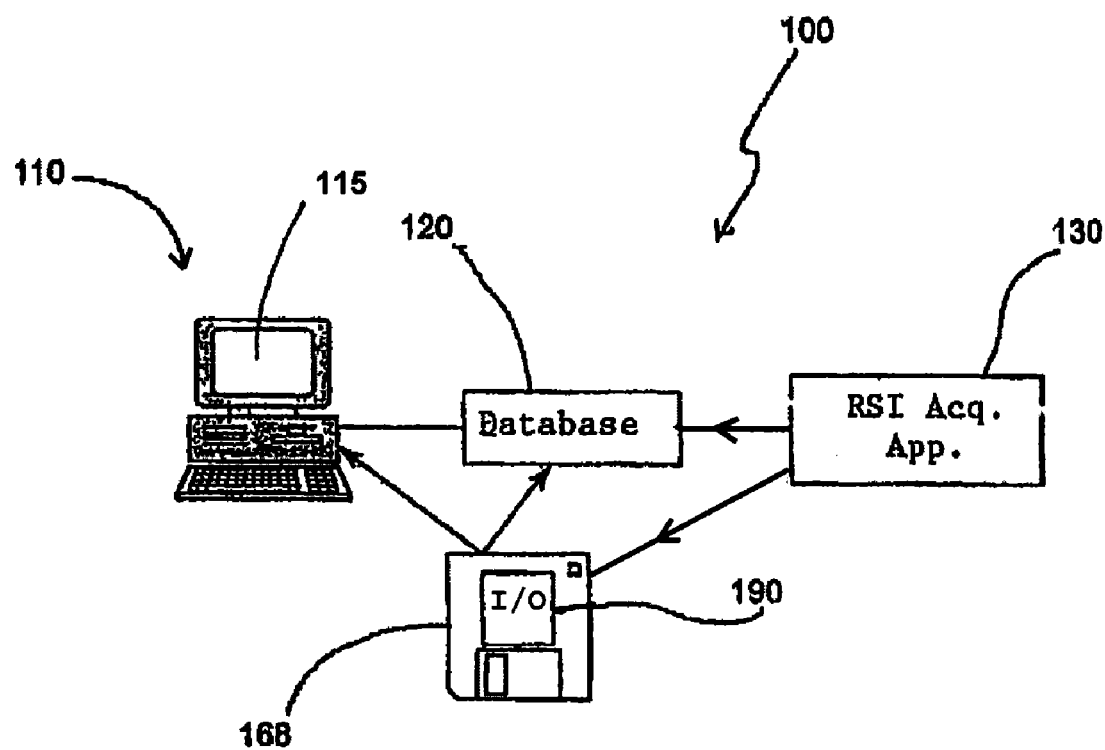
FIG. 1 illustrates a system according to a general embodiment of the present invention.

The present invention is directed to a system and method for data-mining of large datasets of spatial or other type of data adapted for storage and retrieval from a machine readable medium. FIG. 1 illustrates a system 100 according to a general embodiment of the present invention. The system 100 comprises at least one input/output device 130, 190 (e.g., storage medium 168) for inputting data to the system. The input device is coupled to a database 120. The database is communicatively coupled to a computer processor 110 which may have a computer display 115 for outputting information output from the processor. The processor 110 is capable of executing machine readable instructions to cause one or more of a receipt of one or more datasets from the input/output device 130, 190 for storage in the database 120, retrieval of data from the database, processing of the retrieval data, and display of the pre- or post-processed data through display 115 such as for example, a pixilated computer display screen.

In the general embodiment of the present invention, each dataset is represented as a relation R with attributes $A_1$ thru $A_n$ and C and denoted $R(A_1, A_2, \ldots A_n, C)$ with $A_1$ normally representing the key of the relation R and C denoting the class label attribute. An exemplary data set according to the present invention may be comprised, for example, of remotely sensed imagery (RSI) data including satellite images, aerial photography, and ground data. RSI data typically contains several attributes called bands such as visible reflectance intensities (blue, green and red), infrared reflectance intensities (e.g., NIR, MIR1, MIR2 and TIR) and possibly other value bands (e.g., crop yield quantities, crop quality measures, soil attributes and radar reflectance intensities).

In one embodiment of the present invention, a dataset representing an image is viewed as a relational table in which each pixel is a tuple and each band is an attribute. The pixel coordinates, expressed either as x-y coordinates or latitude-longitude pairs, taken in raster order constitute the key attribute and the other bands are the non-key attributes. It is well known in the art that RSI data may be collected in different ways and stored in different formats such as Band Sequential (BSQ), Band Interleaved by Line (BIL) and Band Interleaved by Pixel (BIP). The Band SeQuential (BSQ) format is similar to the Relational format. In BSQ format each band is stored as a separate file. Each individual band uses the same raster order so that the primary key attribute values are calculable and need not be included. Landsat satellite Thematic Mapper (TM) scenes are in BSQ format. The Band Interleaved by Line (BIL) format stores the data in line-major order; the image scan line constitutes the organizing base. That is, BIL organizes all the bands in one file and interleaves them by row (the first row of all bands is followed by the second row of all bands, and so on). Satellite Pour l'Observation de la Terre (SPOT) data, which comes from French satellite sensors, are in the Band Interleaved by Pixel (BIP) format, based on a pixel-consecutive scheme where the banded data is stored in pixel-major order. That is, BIP organizes all bands in one file and interleaves them by pixel. Standard TIFF images are in BIP format.

One embodiment of the instant invention uses a bit Sequential (bSQ) format to organize spatial data as will be described next. See Ding, Q., Khan, M., Roy, A., and Perrizo, W., (2002). The P-tree Algebra, Proceedings of the ACM Symposium on Applied Computing. 426-431. Typically, each attribute of relation R has a numeric value. In a specific embodiment of the present invention, the numeric values are scaled to range between 0 and 255. Each scaled value is then converted into a binary representation as a first step in creating a vertical data structure for storing the spatial data. If x is a numeric value of attribute $A_i$, then the representation of x in b bits is written as:

$$x_{1b-1} \ldots x_{10} = \sum_{j=b-1}^{0} 2^j \cdot x_{1j}$$

where $x_{b-1}$ and $x_0$ are the highest and lowest order bits respectively. One of skill in the art will recognize that although in the exemplary embodiment of the present invention each attribute is represented by a byte, there is no limitation on the data type size. Eight (8) bits are used for convenience but can be expanded to several bytes if finer granularity is desired without departing from the scope of the present invention.

As illustrated in FIG. 2, the bit-sequential (bSQ) formatting of the present invention takes each attribute in R and converts each numerical domain into binary representation. Then, each corresponding bit is vertically decomposed and stored in a separate file. Thus, in the specific embodiment of the present invention, eight separate files are created for each band with one file representing each bit position in the byte. In the context of the comparison of the bSQ format against the prior art formats described above may be made with reference to FIGS. 2, 3 and 4, wherein FIG. 2 provides an illustrative example of a scene described by only two data bands, each having four pixels, two rows, and two columns (both decimal and binary representations are shown), FIGS. 3 and 4 displays the BSQ, BIL, BIP and bSQ formats for the data. Within the bSQ format, file B11 includes the first bit position from each of the four pixels (represented in binary) in the first band, file B12 includes the second bit position from each of the four pixels in the first band, and so on. [See Ding, Q., Khan, M., Roy, A., and Perrizo, W., (2002). The P-tree Algebra, Proceedings of the ACM Symposium on Applied Computing. 426-431].

There are several reasons to use the bSQ format of the preferred embodiment. First, different bits have different degrees of contribution to the value. In some applications, not all bits are needed because high order bits may provide enough information. Second, the bSQ format facilitates the representation of a precision hierarchy. Third, and most importantly, bSQ format facilitates the creation of an efficient, rich data structure, the PC-tree (described in detail below), and accommodates a pruning technique based on a one-bit-at-a-time approach.

The present invention preferably utilizes the established bSQ bit files to create a Peano Count tree, or PC-tree, structure. The PC-tree is a quadrant-based tree. The root of the PC-tree contains the 1-bit count of the entire bit-band denominated the root count (rc). The next level of the tree contains the 1-bit counts of the four quadrants in raster order. At the next level, each quadrant is partitioned into sub-quadrants and their 1-bit counts in raster order constitute the children of the quadrant node. This construction is continued recursively down each tree path until the sub-quadrant is pure, i.e., entirely 1-bits or entirely 0-bits, which may or may not be at the leaf level (1-by-1 sub-quadrant). As explained below, for each band (assuming 8-bit data values, though the model may be applied to data at any number of bits), there are eight basic P-trees, one for each bit position. In the context of the general embodiment, these P-trees are labeled the basic P-trees of the spatial dataset. The notation $P_{b,i}$ is used to denote the basic P-tree for band b and bit position i. It will be apparent to one of skill in the art that there are always 8n basic P-trees for a dataset with n bands.

To illustrate the PC-tree structure, reference is made to FIG. 5 where an 8-row-by-8-column image and its corresponding PC-tree are depicted. In this example, 55 is the count of 1's in the entire image, the numbers at the next level, 16, 8, 15, and 16, are the 1-bit counts for the four major quadrants. Since the first and last quadrants are made up of entirely 1-bits, sub-trees are not needed for these two quadrants (likewise for any pure 0 quadrants). This pattern is continued recursively using the Peano or Z-ordering of the four sub-quadrants at each new level. The process terminates at the "leaf" level (level-0) where each quadrant is a 1-row- 1-column quadrant. If all sub-trees were expanded, including those for quadrants that are pure 1-bits, then the leaf sequence is just the Peano space-filling curve for the original raster image. Note that the fan-out of the PC-tree need not necessarily be 4. It can be any power of 4 (effectively skipping levels in the tree). Also, the fan-out at any one level need not coincide with the fan-out at another level. The fan-out pattern can be chosen to produce maximum compression for each bSQ file.

Referring once again to the 2-dimensional RSI related spatial data, it is clear that for each band (assuming 8-bit data values), 8 basic PC-trees may be created, one for each bit position. For band Bi, the basic PC-trees may be labeled as $P_{i,1}, P_{i,2}, \ldots, P_{i,8}$, thus, $P_{i,j}$ is a lossless representation of the $j^{th}$ bits of the values from the $i^{th}$ band. In addition, $P_{i,j}$ provides the 1-bit count for every quadrant of every dimension. These PC-tree's can be generated quite quickly and provide a "data mining ready", lossless format for storing spatial data. It will be appreciated by one of skill in the art that the 2-dimensional (8×8) array is exemplary of the PC-tree representation of the present invention and may be generalized to a n-dimensional representation. For example, if R is a relational table that consists of three numeric attributes R(A1, A2, A3). FIG. 6 depicts how a numerical value in attribute A1 is converted into binary representation, decomposed into three separate vertical bit vectors and then constructed into 1-dimensional P-tree by recursively dividing the bit vectors by halves and recording the truth of "purely 1-bits" predicate where a predicate 1 indicates that the bits are all 1 and a predicate 0 indicates otherwise.

FIG. 7 illustrates a one bit slice of an attribute A1 with bits numbered from 7 down to 0 with bit 7 being most significant. Given A17, which would be read as, attribute 1 bit slice 7 FIG. 7 shows the conversion to P-Tree. It will be appreciated that at Level 3 (L3) the tree represents the predicate all 1 and since the root is 0 the bit slice is not all 1's. The half is denoted as pure when it contains $2^{level}$ 1-bits with the root having the highest level and the deepest leaf having level 0. The compression is evident at L1 where there are two branches that are not expanded because the sub-tree is pure. The leaves of the tree store the byte value 11100001, representing attribute A17. The attribute may be recovered at the leaf level by the formula (leaf value)*$2^L$ and read from left to right.

Figure 8:
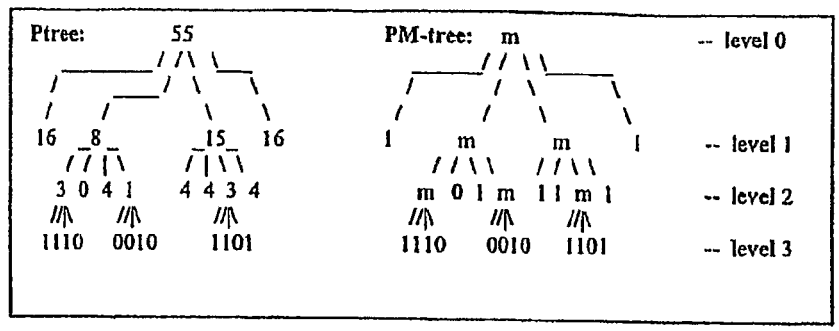
FIG. 8 illustrates a P-tree and a PM-tree (Pure Mask tree) according to one embodiment of the present invention.
Figure 9:
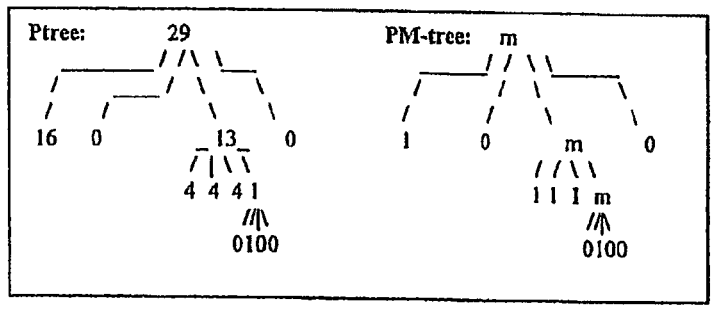
FIG. 9 illustrates a P-tree and a PM-tree (Pure Mask tree) according to a second embodiment of the present invention.

For efficient implementation, in a preferred embodiment a variation of each basic PC-tree, its PM-tree (Pure Mask tree) is constructed as illustrated in FIGS. 8 and 9. In the PM-tree, a 3-value logic is used, in which 11 represents a quadrant of pure 1-bits (pure1 quadrant), 00 represents a quadrant of pure 0-bits (pure0 quadrant), and 01 represents a mixed quadrant. To simplify the exposition, 1 is used instead of 11 for pure1, 0 for pure0, and m for mixed. The PM-tree is particularly useful for the ANDing operation between two PC-trees. The PM-tree specifies the location of the pure1 quadrants of the operands, so that the pure1 result quadrants can be easily identified by the coincidence of pure-1 quadrants in both operands and pure0 result quadrants occur wherever a pure-0 quadrant occurs on at least one of the operands. Starting with a bit-band, Bij, the PM-tree is first constructed and then 1-bits are counted from the bottom up to produce the PC-trees when necessary. For many situations, however, the PM-tree has all the information needed. Experience has shown that the PM-trees can be stored in a very compact form. Therefore, in a preferred embodiment only the basic PM-trees are stored and any needed data structure is constructed from these PM-trees. The PM-tree for the example of FIG. 9 may be found in FIG. 8.

Figure 10:
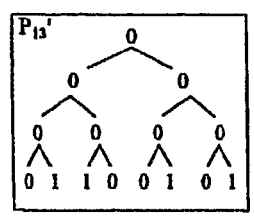
FIG. 10 depicts the complement of a P-tree

The use of the P-tree in any application depends on the algebra that in the general embodiment of the present invention is denominated as a P-tree algebra. The operations in the P-tree algebra include logical AND (^), OR (v), NOT or complement (') and EXCLUSIVE OR (XOR). These operations enable pixel-by-pixel logical operations on P-trees and thereby allow fast and efficient processing of data at the bit level. Each basic P-tree has a natural complement. The complement of a natural P-tree can be constructed directly from the P-tree by simply complementing the counts at each level (subtracting from the pure-1 count at that level) as illustrated in FIG. 10. The complement of a P-tree provides the 0-bit counts for each quadrant, i.e. the NOT operation is a straightforward translation of each count to its quadrant-complement (e.g., a 5 count for a quadrant of 16 pixels has a complement of 11). The AND operation between two P-(PM-) trees is performed by ANDing level-by-level starting from the root level. Table 1 gives the rules for performing P-(PM-) tree ANDing. Operand 1 and Operand 2 are two P-trees (or subtrees) with root $X_1$ and $X_2$ respectively. Using PM-trees, $X_1$ and $X_2$ could be any value among 1, 0 and m. (3-value logic discussed above). For example, with reference to Table 1, it is seen that ANDing a pure-0 P-tree with any P-tree will result in the pure-0 P-tree. It is instructive to note that ANDing two m's may result in a pure-0 quadrant if their four subquadrants result in pure-0 quadrants.

TABLE 1

P-tree ANDing rules

| Operand 1 | Operand 2 | Result |
|---|---|---|
| 1 | $X_2$ | Subtree with root $X_2$ |
| 0 | $X_2$ | 0 |
| $X_1$ | 1 | Subtree with root $X_1$ |
| $X_1$ | 0 | 0 |
| m | m | 0 if four sub-quadrants result in 0; Otherwise m |

Figure 11A:
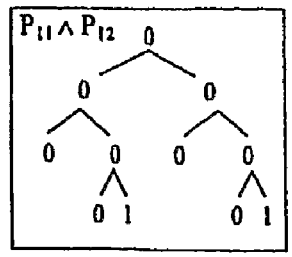
Figure 11B:
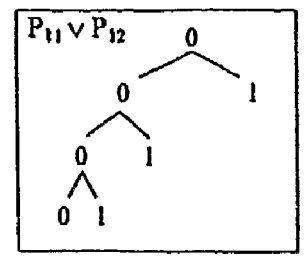

FIGS. 11(*a*) and 11(*b*) illustrate the use of the logical operations on attribute 1 bit slice 7 (i.e. A17) of FIG. 7. FIG. 10 corresponds to the result of complement operation of $P_{13}$, while FIGS. 11(*a*) and 11(*b*) correspond respectively to the result operations of $P_{11} \wedge P_{12}$ and $P_{11} \wedge P_{12}$. The count of 1-bits from the resulting P-tree of logical operations is the root count (rc) computed by summing from the bottom up. For example, a root count of $P_{11} \wedge P_{12}$ (represented as rc($P_{11} \wedge P_{12}$)) is equal to 7, computed from $1 \cdot 2^0 + 1 \cdot 2^1 + 1 \cdot 2^2$ as there is only a single bit of 1 found in each level 0, 1 and 2.

It should be noted that the other algebraic operations, i.e., pixel-by-pixel logical OR and XOR may easily be performed. The OR operation is identical to the AND operation except that the role of the 1-bits and the 0-bits are reversed.

It should further be noted that the generalized construction of the P-tree data structure disclosed and illustrated above can be used for n-dimensional spatial data without departing from the spirit or scope of the invention. For instance, with 3-dimensional data, each level is partitioned into octants and so on. Furthermore, the P-tree data structure and the associated algebra is equally applicable to non-spatial data. [See Perera, A., Denton, A., Kotala, P., Jockheck, W., Granda, W. V., and Perrizo, W., (2002). P-tree Classification of Yeast Gene Deletion Data. SIGKDD Explorations, 4(2), 108-109; See also Rahal, I., and Perrizo, W., (2004). An Optimized Approach for KNN Text Categorization using P-Trees. Proceedings of ACM Symposium on Applied Computing, 613-617].

Data mining in general is the search for hidden patterns that may exist in large databases. Spatial data mining in particular is the discovery of interesting relationships and characteristics that may exist implicitly in spatial databases. One feature of spatial data is the neighborhood property. For example, in an image, neighboring pixels may have similar properties. Spatial data is a promising area for clustering. However, due to the large size of spatial data, such as satellite images, the existing methods are not very suitable. The data organization, bit Sequential organization (bSQ) and a lossless, data-mining ready data structure, and the Peano Count tree (PC-tree) of the preferred embodiment of the present invention represent the information needed to mine the dataset in an efficient and ready-to-use form. The rich and efficient PC-tree storage structure and fast PC-tree algebra, facilitate the development of a system and method for clustering that is fast and scalable as will be described below. Clustering involves collecting similar objects mutually exclusively and collectively exhaustively, to achieve minimal dissimilarity within one cluster and maximal dissimilarity among clusters. [See Han, J., and Kamber, M. (2001), Data Mining: Concepts and Techniques, San Francisco, Calif., Morgan Kaufmann].

The present invention contemplates a partitioning clustering of the dataset where the aim is to partition a given set of n points in a m dimensional space into k groups, called clusters, so that points within each cluster are Tear each other. One way to measure the closeness or nearness of a first point to some other predefined collection of points is by examining the total variation of the points in the collection about the first point. In this regard, the general embodiment of the present invention defines a vertical set inner product (VSIP) technique that can be used to efficiently and scalably measure the mean value and total variation of a set about a fixed point in a large dataset to determine the closeness of the fixed point to the set of points. The set can be any projected subspace of any vector space, including oblique subspaces instead of just dimensional subspaces. The technique is very useful in classification, clustering and outlier detection tasks. Because the VSIP technique used the P-tree data structure and the associated algebra, the vertical set inner product is also referenced as PSIP. In the description that follows, VSIP and PSIP are used interchangeably to denote the vertical set inner product.

Vertical set inner products primarily measures a total variation of set of points in class X about a point. A method to determine the VSIP will now be described. If X denotes any set of vectors in $R(A_1 \ldots A_n)$ with P-tree class mask, PX, where $x \in X$ is represented in b bits, then $$x = (x_{1(b-1)} \ldots x_{10}, x_{2(b-1)} \ldots x_{20}, \ldots, x_{n(b-1)} \ldots x_{n0})$$

and if $$a = (a_{1(b-1)} \ldots a_{10}, a_{2(b-1)} \ldots a_{20}, \ldots, a_{n(b-1)} \ldots a_{n0})$$

represents a target vector, then vertical set inner products ($X \circ a$) is defined as:

$$X \cdot a = \sum_{x \in X} x \cdot a \quad \text{(Equation 1)}$$

$$= \sum_{i=1}^{n} \sum_{j=b-1}^{0} rc(PX \wedge P_{ij}) \cdot \sum_{k=0}^{b-1} 2^{j+k} \cdot a_{ik}$$

The following example details the steps involved in obtaining the above relationship. For the sake of convenience and without digressing from the spirit and scope of the present invention, a dataset with three attributes A1, A2, and A3 is selected. Each attribute has a numerical domain and another attribute Rank has a single categorical domain as illustrated in table 2, a P-tree class masks, $PX_i$, are achieved by creating a vertical bit vector, one for each class, with bit 1 is assigned to every tuples containing that class and bit 0 to every other tuples. Assume that attribute Rank is chosen to be a class attribute and consists of two types of value so that two P-tree class masks can be created, one for each distinct value.

TABLE 2

Training set example.

| $A_1$ | $A_2$ | $A_3$ | Rank |
|---|---|---|---|
| 9 | 31 | 6 | Low |
| 11 | 20 | 5 | Low |
| 11 | 21 | 4 | High |
| 7 | 23 | 3 | High |
| 7 | 27 | 1 | High |
| 8 | 31 | 0 | High |

Subsequently, each numerical domain is converted into a base-two representation with a uniform b bits width. The maximum width is determined from the largest value in the training set. Next, P-tree class masks are created as depicted in table 3. A reasonable number of zeros is used to pad the entries so as to make a uniform bit width for any attributes that actually can be represented in less than b bits. In table 3, attribute A3 has been padded with two additional zero bits to make a uniform 5 bits width because 31 (domain of tuple 1 or 7 attribute A2, the largest value found in the training set) is actually $(11111)_2$.

TABLE 3

P-tree class masks of attribute Rank.

| | | | Rank | |
|---|---|---|---|---|
| $A_1$ | $A_2$ | $A_3$ | $PX_1$ | $PX_2$ |
| 01001 | 11111 | 00110 | 0 | 1 |
| 01011 | 10100 | 00101 | 0 | 1 |
| 01011 | 10101 | 00100 | 1 | 0 |
| 00111 | 10111 | 00011 | 1 | 0 |
| 00111 | 11011 | 00001 | 1 | 0 |
| 01000 | 11111 | 00000 | 1 | 0 |

As noted above, a root count (rc) is the total number of bit 1's counted from the resulting operations of P-tree operands. A root count (rc) of $PX_1 \wedge P_{13}$, written as $rc(PX_1 \wedge P_{13})$, is equal to 2 where $PX_1$ is P-tree class mask of class high and $P_{13}$ is P-tree of attribute $A_j$ at fourth bit position. Let a center vector a=(14, 10, 19) or in binary a=(01110, 01010, 10011), the root counts of each P-tree class mask with all corresponding P-trees are as listed below.

$rc(PX_1 \wedge P_{14})=0$  $rc(PX_2 \wedge P_{14})=0$ $rc(PX_1 \wedge P_{13})=2$  $rc(PX_2 \wedge P_{13})=2$ $rc(PX_1 \wedge P_{12})=2$  $rc(PX_2 \wedge P_{12})=0$ $rc(PX_1 \wedge P_{11})=3$  $rc(PX_2 \wedge P_{11})=1$ $rc(PX_1 \wedge P_{10})=3$  $rc(PX_2 \wedge P_{10})=2$ $rc(PX_1 \wedge P_{24})=4$  $rc(PX_2 \wedge P_{24})=2$ $rc(PX_1 \wedge P_{23})=2$  $rc(PX_2 \wedge P_{23})=1$ $rc(PX_1 \wedge P_{22})=3$  $rc(PX_2 \wedge P_{22})=2$ $rc(PX_1 \wedge P_{21})=3$  $rc(PX_2 \wedge P_{21})=1$ $rc(PX_1 \wedge P_{20})=4$  $rc(PX_2 \wedge P_{20})=1$ $rc(PX_1 \wedge P_{34})=0$  $rc(PX_2 \wedge P_{34})=0$ $rc(PX_1 \wedge P_{33})=0$  $rc(PX_2 \wedge P_{33})=0$ $rc(PX_1 \wedge P_{32})=1$  $rc(PX_2 \wedge P_{32})=2$ $rc(PX_1 \wedge P_{31})=1$  $rc(PX_2 \wedge P_{31})=1$ $rc(PX_1 \wedge P_{30})=2$  $rc(PX_2 \wedge P_{30})=1$ Hence, using the relationship of Equation 1, the set inner product for class High is as follows:

$$\begin{aligned}(X_1 \circ a) = &\, 0 \cdot (2^8 \cdot 0 + 2^7 \cdot 1 + 2^6 \cdot 1 + 2^5 \cdot 1 + 2^4 \cdot 0) + \\ &\, 2 \cdot (2^7 \cdot 0 + 2^6 \cdot 1 + 2^5 \cdot 1 + 2^4 \cdot 1 + 2^3 \cdot 0) + \\ &\, 2 \cdot (2^6 \cdot 0 + 2^5 \cdot 1 + 2^4 \cdot 1 + 2^3 \cdot 1 + 2^2 \cdot 0) + \\ &\, 3 \cdot (2^5 \cdot 0 + 2^4 \cdot 1 + 2^3 \cdot 1 + 2^2 \cdot 1 + 2^1 \cdot 0) + \\ &\, 3 \cdot (2^4 \cdot 0 + 2^3 \cdot 1 + 2^2 \cdot 1 + 2^1 \cdot 1 + 2^0 \cdot 0) + \\ &\, 4 \cdot (2^8 \cdot 0 + 2^7 \cdot 1 + 2^6 \cdot 0 + 2^5 \cdot 1 + 2^4 \cdot 0) + \\ &\, 2 \cdot (2^7 \cdot 0 + 2^6 \cdot 1 + 2^5 \cdot 0 + 2^4 \cdot 1 + 2^3 \cdot 0) + \\ &\, 3 \cdot (2^6 \cdot 0 + 2^5 \cdot 1 + 2^4 \cdot 0 + 2^3 \cdot 1 + 2^2 \cdot 0) + \\ &\, 3 \cdot (2^5 \cdot 0 + 2^4 \cdot 1 + 2^3 \cdot 0 + 2^2 \cdot 1 + 2^1 \cdot 0) + \\ &\, 4 \cdot (2^4 \cdot 0 + 2^3 \cdot 1 + 2^2 \cdot 0 + 2^1 \cdot 1 + 2^0 \cdot 0) + \\ &\, 0 \cdot (2^8 \cdot 1 + 2^7 \cdot 0 + 2^6 \cdot 0 + 2^5 \cdot 1 + 2^4 \cdot 1) + \\ &\, 0 \cdot (2^7 \cdot 1 + 2^6 \cdot 0 + 2^5 \cdot 0 + 2^4 \cdot 1 + 2^3 \cdot 1) + \\ &\, 1 \cdot (2^6 \cdot 1 + 2^5 \cdot 0 + 2^4 \cdot 0 + 2^3 \cdot 1 + 2^2 \cdot 1) + \\ &\, 1 \cdot (2^5 \cdot 1 + 2^4 \cdot 0 + 2^3 \cdot 0 + 2^2 \cdot 1 + 2^1 \cdot 1) + \\ &\, 2 \cdot (2^4 \cdot 1 + 2^3 \cdot 0 + 2^2 \cdot 0 + 2^1 \cdot 1 + 2^0 \cdot 1) \\ = &\, 0 \cdot 224 + 2 \cdot 112 + 2 \cdot 56 + 3 \cdot 28 + 3 \cdot 14 + 4 \cdot 160 + 2 \cdot \\ &\, 80 + 3 \cdot 40 + 3 \cdot 20 + 4 \cdot 10 + 0 \cdot 304 + 0 \cdot 152 + 1 \cdot 76 + \\ &\, 1 \cdot 38 + 2 \cdot 19 \\ = &\, 1{,}634\end{aligned}$$

Similarly for class Low, the computation of $(X_2 \circ a)$ yields the value 999.

Thus, the vertical set inner product (VSIP) in accordance with the present invention can be used to obtain a numerical measure of the closeness (nearness) of a point in a dataset to a set of points in the dataset. An exemplary embodiment of the present invention contemplates a vertical set vector difference, denoted as (X−a), that computes the sum of vector differences from a set of vectors X to a target vector a where x∈X are vectors that belong to the same class. If X is any set of vectors in R(A1 . . . An) with PX denoting a class mask and vectors x and a are both represented by b bits wide binary representation, such that:

$x = (x_{1(b-1)} \ldots x_{10}, x_{2(b-1)} \ldots x_{20}, \ldots, x_{n(b-1)} \ldots x_{n0})$ and $a = (a_{1(b-1)} \ldots a_{10}, a_{2(b-1)} \ldots a_{20}, \ldots, a_{n(b-1)} \ldots a_{n0})$ then, a vertical set vector difference (X−a) is defined as:

$X - a = (v_1, v_2, \ldots, v_i, \ldots, v_n), 1 \leq i \leq n$ $$v_i = \sum_{j=b-1}^{0} 2^j \cdot (rc(PX \wedge P_{ij}) - rc(PX) \cdot a_{ij}) \quad \text{(Equation 2)}$$

Figure 12:
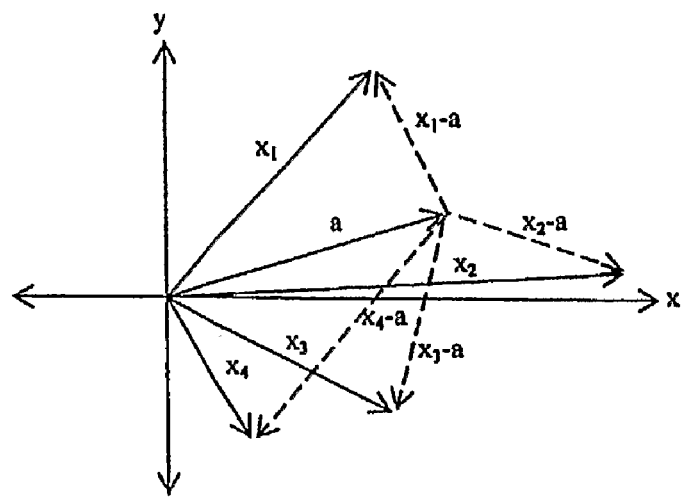

If the aforementioned vectors are considered to be vectors in a two dimensional space where $x_i$ are vectors from the same class and $1 \leq i \leq 4$, then total separation of vectors $x_i$ to a center vector a can be measured by (X−a), that is, a summation of each vector difference $(x_1-a)+(x_2-a)+(x_3-a)+(x_4-a)$ as illustrated in FIG. 12. The relationship denoted by Equation 2 returns a single vector that represents a cumulative length of a set of vectors to a center. However, since a vector has both magnitude and direction, the final summation may be misleading of the actual separation between set of vectors and the center, especially when negative vectors are involved in the summation. Therefore, the preferred embodiment of the present invention uses a modified relationship, the vertical set inner products of vector difference, that combines the vertical set inner products and vector difference concepts to compute the total variation (or because the vertical data structure is used, the vertical total variation (VTV)) of a set of vector X about a center vector a. The relationship is arrived at as follows:

$$\begin{aligned}(X-a) \cdot (X-a) &= \sum_{x \in X} (x-a) \cdot (x-a) \quad \text{(Equation 3)} \\ &= \sum_{x \in X} \sum_{i=1}^{n} (x_i - a_i)^2 \\ &= \sum_{x \in X} \left( \sum_{i=1}^{n} x_i^2 - 2 \cdot \sum_{i=1}^{n} x_i a_i + \sum_{i=1}^{n} a_i^2 \right) \\ &= \sum_{x \in X} \sum_{i=1}^{n} x_i^2 - 2 \cdot \sum_{x \in X} \sum_{i=1}^{n} x_i a_i + \sum_{x \in X} \sum_{i=1}^{n} a_i^2 \\ &= T_1 + T_2 + T_3\end{aligned}$$

where $$T_1 = \sum_{x \in X} \sum_{i=1}^{n} x_i^2 = \sum_{i=1}^{n} \sum_{j=b-1}^{0} 2^{2j} \cdot rc(PX \wedge P_{ij}) + \sum_{\substack{k=(j*2)\ldots(j+1)\&\&j\neq 0 \\ l=(j-1)\ldots 0\&\&j\neq 0}} 2^k \cdot rc(PX \wedge P_{ij} \wedge P_{il})$$

$$\begin{aligned}T_2 &= -2 \cdot \sum_{x \in X} \sum_{i=1}^{n} x_i a_i \\ &= -2 \cdot \sum_{x \in X} \sum_{i=1}^{n} \left( \sum_{j=b-1}^{0} 2^j \cdot x_{ij} \sum_{j=b-1}^{0} 2^j \cdot a_{ij} \right) \\ &= -2 \cdot \sum_{i=1}^{n} \sum_{j=b-1}^{0} \sum_{x \in X} 2^j \cdot x_{ij} \cdot \sum_{j=b-1}^{0} 2^j \cdot a_{ij} \\ &= -2 \cdot \sum_{i=1}^{n} \sum_{j=b-1}^{0} 2^j \cdot rc(PX \wedge P_{ij}) \cdot \sum_{j=b-1}^{0} 2^j \cdot a_{ij} \\ &= -2 \cdot \sum_{i=1}^{n} a_i \cdot \sum_{j=b-1}^{0} 2^j \cdot rc(PX \wedge P_{ij})\end{aligned}$$

-continued $$T_3 = \sum_{x \in X} \sum_{i=1}^{n} a_i^2$$

$$= \sum_{x \in X} \sum_{i=1}^{n} \left( \sum_{j=b-1}^{0} 2^j \cdot a_{ij} \right)^2$$

$$= rc(PX) \cdot \sum_{i=1}^{n} \left( \sum_{j=b-1}^{0} 2^j \cdot a_{ij} \right)^2$$

$$= rc(PX) \cdot \sum_{i=1}^{n} a_i^2$$

The relationship defined by Equation 2 measures the sum of vector length connecting X and a. Therefore, $$\frac{(X-a) \cdot (X-a)}{N}$$

where N refers to the total number of vectors in X, intrinsically measures the total variation of X about a. In terms of the vertical data structure and associated operations of the present invention, N can be easily computed using rc(PX), that is a total number of bit 1 counted from P-tree class mask X. When the set of vectors is relatively close to a then the total variation will be small. The advantage of vertical set inner products is that root count values can be pre-computed and stored because root count operations are obviously independent from a in PSIPs, thus making it possible for them to be computed in advance. These root counts include root counts of P-tree class masks PX itself, root counts Of $PX \wedge P_{ij}$ and root counts of $PX \wedge P_{ij} \wedge P_{il}$ where $P_{ij}$ and $P_{il}$ are corresponding P-trees in of the training set.

The total variation described above may be demonstrated using the training example presented in table 2 above with the target vector a=(14, 10, 19). Denoting a set of vectors in $X_1$, the vertical set inner product of vector difference may be represented as:

$$(X_1-a) \circ (X_1-a) = T_1 + T_2 + T_3.$$

The calculation of $T_1$, $T_2$, and $T_3$ is set forth below:

$$T_1 = 2^8 \cdot rc(PX_1 \wedge P_{14}) + 2^8 \cdot rc(PX_1 \wedge P_{14} \wedge P_{13}) +$$
$$2^7 \cdot rc(PX_1 \wedge P_{14} \wedge P_{12}) + 2^6 \cdot rc(PX_1 \wedge P_{14} \wedge P_{11}) +$$
$$2^5 \cdot rc(PX_1 \wedge P_{14} \wedge P_{10}) + 2^6 \cdot rc(PX_1 \wedge P_{13}) +$$
$$2^6 \cdot rc(PX_1 \wedge P_{13} \wedge P_{12}) + 2^5 \cdot rc(PX_1 \wedge P_{13} \wedge P_{11}) +$$
$$2^4 \cdot rc(PX_1 \wedge P_{13} \wedge P_{10}) + 2^4 \cdot rc(PX_1 \wedge P_{12}) +$$
$$2^4 \cdot rc(PX_1 \wedge P_{12} \wedge P_{11}) + 2^3 \cdot rc(PX_1 \wedge P_{12} \wedge P_{10}) +$$
$$2^2 \cdot rc(PX_1 \wedge P_{11}) + 2^2 \cdot rc(PX_1 \wedge P_{11} \wedge P_{10}) +$$
$$2^0 \cdot rc(PX_1 \wedge P_{10}) + 2^8 \cdot rc(PX_1 \wedge P_{24}) +$$
$$2^8 \cdot rc(PX_1 \wedge P_{24} \wedge P_{23}) + 2^7 \cdot rc(PX_1 \wedge P_{24} \wedge P_{22}) +$$
$$2^6 \cdot rc(PX_1 \wedge P_{24} \wedge P_{21}) + 2^5 \cdot rc(PX_1 \wedge P_{24} \wedge P_{20}) +$$
$$2^6 \cdot rc(PX_1 \wedge P_{23}) + 2^6 \cdot rc(PX_1 \wedge P_{23} \wedge P_{22}) +$$
$$2^5 \cdot rc(PX_1 \wedge P_{23} \wedge P_{21}) +$$
$$2^4 \cdot rc(PX_1 \wedge P_{23} \wedge P_{20}) + 2^4 \cdot rc(PX_1 \wedge P_{22}) +$$
$$2^4 \cdot rc(PX_1 \wedge P_{22} \wedge P_{21}) + 2^3 \cdot rc(PX_1 \wedge P_{22} \wedge P_{20}) +$$

-continued $$2^2 \cdot rc(PX_1 \wedge P_{21}) + 2^2 \cdot rc(PX_1 \wedge P_{21} \wedge P_{20}) +$$
$$2^0 \cdot rc(PX_1 \wedge P_{20}) + 2^8 \cdot rc(PX_1 \wedge P_{34}) +$$
$$2^8 \cdot rc(PX_1 \wedge P_{34} \wedge P_{33}) + 2^7 \cdot rc(PX_1 \wedge P_{34} \wedge P_{32}) +$$
$$2^6 \cdot rc(PX_1 \wedge P_{34} \wedge P_{31}) + 2^5 \cdot rc(PX_1 \wedge P_{34} \wedge P_{30}) +$$
$$2^6 \cdot rc(PX_1 \wedge P_{33}) + 2^6 \cdot rc(PX_1 \wedge P_{33} \wedge P_{32}) +$$
$$2^5 \cdot rc(PX_1 \wedge P_{33} \wedge P_{31}) + 2^4 \cdot rc(PX_1 \wedge P_{33} \wedge P_{30}) +$$
$$2^4 \cdot rc(PX_1 \wedge P_{32}) + 2^4 \cdot rc(PX_1 \wedge P_{32} \wedge P_{31}) +$$
$$2^3 \cdot rc(PX_1 \wedge P_{32} \wedge P_{30}) + 2^2 \cdot rc(PX_1 \wedge P_{31}) +$$
$$2^2 \cdot rc(PX_1 \wedge P_{31} \wedge P_{30}) + 2^0 \cdot rc(PX_1 \wedge P_{30})$$
$$= 256 \cdot 0 + 256 \cdot 0 + 128 \cdot 0 + 64 \cdot 0 + 32 \cdot 0 + 64 \cdot 2 + 64 \cdot$$
$$0 + 32 \cdot 1 + 16 \cdot 1 + 16 \cdot 2 + 16 \cdot 2 + 8 \cdot 2 + 4 \cdot 3 + 4 \cdot 3 +$$
$$1 \cdot 3 + 256 \cdot 4 + 256 \cdot 2 + 128 \cdot 3 + 64 \cdot 3 + 32 \cdot 4 + 64 \cdot 2 +$$
$$64 \cdot 1 + 32 \cdot 2 + 16 \cdot 2 + 16 \cdot 3 + 16 \cdot 2 + 8 \cdot 3 + 4 \cdot 3 +$$
$$4 \cdot 3 + 1 \cdot 4 + 256 \cdot 0 + 256 \cdot 0 + 128 \cdot 0 + 64 \cdot 0 + 32 \cdot 0 +$$
$$64 \cdot 0 + 64 \cdot 0 + 32 \cdot 0 + 16 \cdot 0 + 16 \cdot 1 + 16 \cdot 0 + 8 \cdot 0 +$$
$$4 \cdot 1 + 4 \cdot 1 + 1 \cdot 2$$
$$T_1 = 2,969$$

$$T_2 = -2 \cdot (14 \cdot (2^4 \cdot rc(PX_1 \wedge P_{14}) + 2^3 \cdot rc(PX_1 \wedge P_{13}) +$$
$$2^2 \cdot rc(PX_1 \wedge P_{12}) + 2^1 \cdot rc(PX_1 \wedge P_{11}) + 2^0 \cdot rc(PX_1 \wedge P_{10})) +$$
$$10 \cdot (2^4 \cdot rc(PX_1 \wedge P_{24}) + 2^3 \cdot rc(PX_1 \wedge P_{23}) +$$
$$2^2 \cdot rc(PX_1 \wedge P_{22}) + 2^1 \cdot rc(PX_1 \wedge P_{21}) + 2^0 \cdot rc(PX_1 \wedge P_{20})) +$$
$$19 \cdot (2^4 \cdot rc(PX_1 \wedge P_{34}) + 2^3 \cdot rc(PX_1 \wedge P_{33}) +$$
$$2^2 \cdot rc(PX_1 \wedge P_{32}) + 2^1 \cdot rc(PX_1 \wedge P_{31}) + 2^0 \cdot rc(PX_1 \wedge P_{30})))$$
$$= -2 \cdot (462 + 1,020 + 152)$$
$$T_2 = -3,268$$

$$T_3 = rc(PX_1) \cdot (14^2 + 10^2 + 19^2)$$
$$= 4 \cdot 657$$
$$= 2,628$$

Using the relationship of Equation 3, the total variation of $X_1$ about a:

$$(X_1 - a) \cdot (X_1 - a) = \frac{T_1 + T_2 + T_3}{N} = \frac{T_1 + T_2 + T_3}{rc(PX_1)}$$
$$= \frac{2,969 - 3,268 + 2,628}{4}$$
$$= 582.25$$

Similarly, total variation of $X_2$ about a=470. Therefore, according to the preferred embodiment of the present invention, $X_2$ is closer to a.

The Vertical Set Inner Product (VSIP) algorithm produces a table of high-quality information, which can be used for clustering and outlier analysis. Vertical data structuring allows the creation of this table in a fast and efficient manner. The vertical data structure described above, i.e. the Predicate-Tree or P-tree, allows the building out of rectangular neighborhoods of increasing radius until an upturn or downturn in density is discovered and to do so in a scalable manner. An exemplary use of rectangular neighborhoods in conjunction with the P-tree data structure, P-tree algebra and the set inner products is described below.

A vector, a, is first, randomly selected from the space, X. The Set Inner Product of X about a is then calculated and inserted into a set inner product relate table shown below as table 4. Table 4 contains columns for the selected points, a, the Set Inner Product about each a (denoted as (X−a)∘(X−a) for reasons which will become clear later in the description), the radii to which the point a can be built-out before the local density begins to change significantly, these local build-out densities, and the direction of change in that final local build-out density (up or down). One of the important operations is the operation of pruning of X before iteratively picking the next value a, i.e. prune off the maximum built-out disk for which the density remains roughly constant. This pruning step facilitates the building of a table containing the essential local density information, without requiring a full scan of X. The table structure is as follows:

TABLE 4

Local density information table.

| a | (X-a)o(X-a) | Build-out Radius | Build-out Density | +/− variation |
|---|---|---|---|---|
| $a_7$ | 38 | 5 | 10 | |
| | 38 | 10 | 11 | |
| | 38 | 15 | 3 | − |
| $a_3$ | 44 | 5 | 9 | |
| | 44 | 10 | 1 | − |
| $a_{101}$ | 46 | 5 | 18 | |
| | 46 | 10 | 17 | |
| | 46 | 15 | 38 | + |

Lower values of (X−a)∘(X−a) are associated with points, a, that are "deep cluster points" (deep within clusters), while higher values of (X−a)∘(X−a) are associated with outliers. Middle values of (X−a)∘(X−a) are further examined using the other columns of the table to determine their nature. The table can be sorted on the Set Inner Product column. Then the table can be used to quickly reveal a set to select a high-quality value for k (the number of centroids). Those centroids can be used to cluster the data set (putting each non-centroid point with the closest centroid point associated with it) or, the method can be used as a pre-processing k-means or k-medoid clustering step. The method can also be used to identify outliers (contents of the disks centered at the bottom rows in the table—until ~98.5% of the set has been identified as outliers), or detect cluster boundary points by examining the outer disk where the variation changes.

The preferred embodiment of the present invention contemplates a sequence of computer implemented instructions (computer algorithm) or steps that when executed on a processor will implement the set inner product described above to enable data mining a dataset. The computer algorithm embodies a method that begins by specifying a threshold value (τ) for a change in density which would represent a significant variation in density for the particular data set being evaluated. This step is followed by the selection of a point a from the space X (i.e. select an a∈X) and the construction of a disk of radius r, denominated D(a,r) about a. The radius r is increased until the density changes significantly as defined by the specified threshold value of the change in density. The Set Inner Product of X about a is then calculated and inserted into a set inner product table such as Table 60. The tabulation lists the selected points a, the Set Inner Product about each a (denoted as (X−a)∘(X−a)), the radii r to which the point a can be built-out before the local density begins to change significantly (i.e. largest disk of common density) as indicated by the threshold value (τ), the local build-out densities, and the direction of change in the final local build-out density (up or down). All the points in the largest disk of common density (i.e. the radius $r_{final}$ at which the density variation is flagged as significant by the threshold value (τ) so that all the points in the largest disk have approximately the same local density as the point a) are pruned to yield a smaller set X−x, where x is the set of all points in D(a, $r_{final}$)∈X. The point a is replaced by a point b∈X−x and the all the steps in the process are repeated until the set X is empty. The resultant table is sorted on the Set Inner Product column to reveal a set of points that represent a high-quality value for k (the number of centroids). These centroids can be used to cluster the data set (putting each non-centroid point with the closest centroid point associated with it) or, the data in the table can be used as a pre-processing k-means or k-medoid clustering step to significantly reduce the iterations in the k-means clustering method. The data in the table can also be used to identify outliers by defining outliers, for example, to be the contents of the disks centered towards the points in the bottom rows in the table.

Figures 13A, 13B:
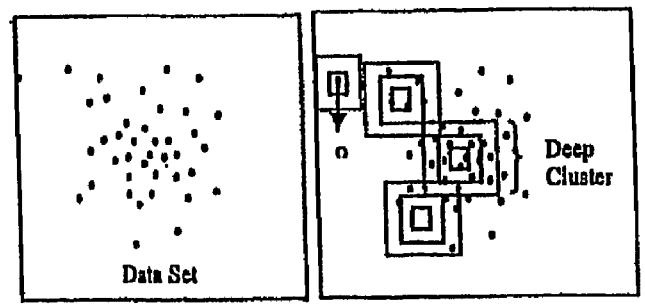
FIG. 13(a) illustrates a data set according to the present invention.
FIG. 13(b) illustrates a result generated using the algorithm of the present invention.

FIGS. 13(a) and 13(b) illustrate an example of the algorithm pictorially. The clusters will be built based on the total variation. The disks will be built based on the density threshold with increasing radius r. As the disks are built out and a major change in density of the disks is observed, the information is added to the table and the disk is pruned. For example, when there is a data point in the first disk and as the disk is built out by increasing the radius r about the data point, if there are no other data points in the next disk, then the data point in the first disk is tagged as an outlier, the information is stored in the table and the disk is pruned. The disks are no longer built around that data point. In case of boundary points, the information is stored in the table and the points are pruned based on the change in variation of the disk.

Experimental Results

One of the experiments conducted in connection with the present invention used the vertical P-tree data structure for computing the set inner product to demonstrate that the computation scales with respect to the data size. The execution time for the calculation of the set inner product employing a vertical approach (vertical data structure and horizontal bit-wise AND operation) was compared with the horizontal approach (horizontal data structure and vertical scan operation). The horizontal set inner products (HSIPs) were computed as follows for a set of vectors X in R($A_1$ . . . $A_n$) and x=($x_1$, $x_2$, . . . , $x_n$) belonging to class X. A vector a=($a_1$, $a_2$, . . . , $a_n$) was chosen as a target vector, then the horizontal set inner products (X∘a) was defined as:

$$X \cdot a = \sum_{x \in X} x \cdot a = \sum_{x \in X} \sum_{i=1}^{n} x_i \cdot a_i$$

Similarly, horizontal set inner products (HSIPs) of vector differences was defined as:

$$(X - a) \cdot (X - a) = \sum_{x \in X} (x - a) \cdot (x - a)$$

-continued $$= \sum_{x \in X} \sum_{i=1}^{n} (x_i - a_i)^2$$

The execution times were plotted with respect to the size of the data set. Performance of both algorithms was observed under different machine specifications, including an SGI Altix CC-NUMA machine. Table 5 summarizes the different types of machines used for the experiments.

TABLE 5

The specification of machines used

| Machine | Specification |
|---|---|
| AMD.1 GB | AMD Athlon K7 1.4 GHz, 1 GB RAM |
| P4.2 GB | Intel P4 2.4 GHz processor 2 GB RAM |
| SGI Altix | SGI Altix CC-NUMA 12 processor shared memory (12 × 4 GB RAM). |

The experimental data was generated based on a set of aerial photographs from the Best Management Plot (BMP) of Oakes Irrigation Test Area (OITA) near Oakes, N. Dak. Latitude and longitude are 970 42'18"W, taken in 1998. The image contains three bands: red, green, and blue reflectance values. The original image of size 1024×1024 pixels (having cardinality of 1,048,576) was used. Corresponding synchronized data for soil moisture, soil nitrate and crop yield were also used for experimental evaluations. Combining of all bands and synchronized data, a dataset with 6 dimensions was obtained.

Additional datasets with different sizes were synthetically generated based on the original data sets to study the timing and scalability of PSIPs technique of the instant invention. Both timing and scalability were evaluated with respect to data size. In a first embodiment of the instant invention, due to a small number of cardinality obtained from the original dataset (1,048,576 records), the dataset was super-sampled by using a simple image processing tool on the original dataset to produce five other large datasets, each of which having cardinality of 2,097,152, 4,194,304 (2048×2048 pixels), 8,388,608, 16,777,216 (4096×4096 pixels) and 25,160,256 (5016×5016 pixels).

Figure 14:
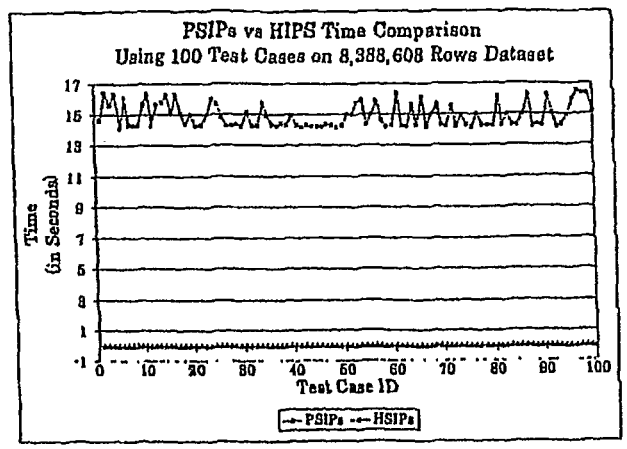
FIG. 14 is a plot of the PSIP versus HSIP time comparison using test cases.
Figure 15:
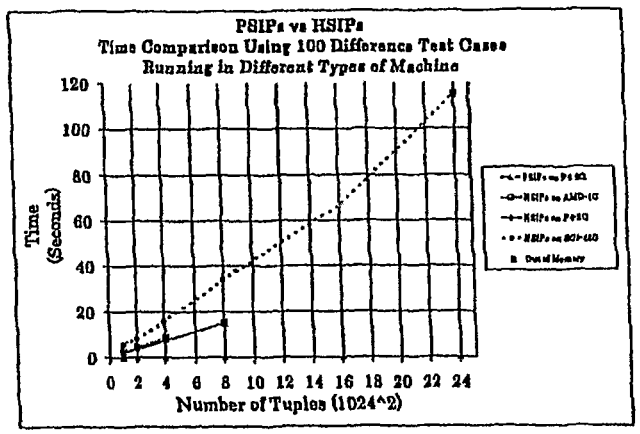
FIG. 15 is a graphical representation of the scalability of the PSIP versus the HSIP for different machine configurations.
Figure 16:
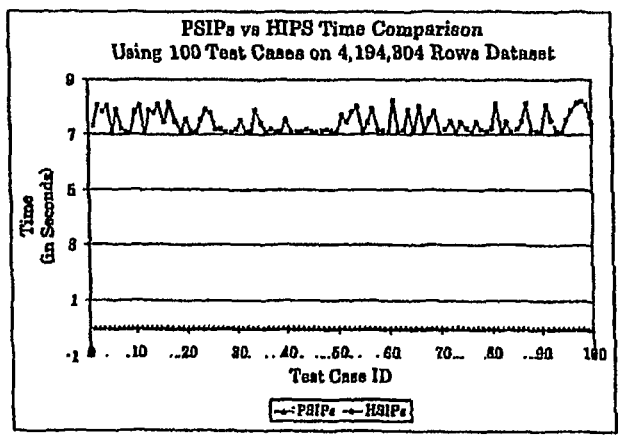
FIG. 16 is a plot depicting the time for running a set of test cases.

The first performance evaluation was done using a P4 with 2 GB RAM using the first embodiment of the present invention. Synthetic datasets having 4.1 and 8.3 million rows were used to evaluate execution time of the method computing total variation for 100 different test cases. Datasets with a size greater than 8.3 million rows could not be executed in this machine since out of memory error occurred when running HSIPs. FIGS. 14-16 depict the execution time comparison between PSIPs and HSIPs.

As depicted in FIGS. 14 and 15, up to 8.3 million rows, both algorithms apparently scale, however PSIPs is significantly fast compared to HSIPs. It only requires 0.0003 and 0.0004 seconds on average to complete the calculation on each dataset, very much less than HSIPs which need 7.3800 and 15.1600 seconds on average on each dataset respectively. These significant disparities are due to the superiority of PSIPs to use similar root count values, pre-computed and stored during P-trees creation even though various test case vectors are fed during calculation. However, the test case vector a is only involved in the calculation of two terms, $T_2$ and $T_3$, of the PSIP. Hence, it is independent of the root count $rc(PX \wedge P_{ij})$ operations. Thus, the root count operations can be pre-computed once and reused repeatedly regardless of the number of total variation that are computed so long as the dataset and set of class X remain unchanged.

The timing was also observed with respect to scalability when executing on machines with different hardware configurations using the second embodiment of the present invention. The hardware configuration needed to be increased to accommodate the horizontal version of the set inner product calculation on the larger data sets. However, the set inner product for the largest data set could still be computed on the smallest machine (AMD Athlon with 1 GB memory) using the vertical p-tree data structure. Table 6 presents the average time to compute the set inner product using the two different techniques under different machines and figure further illustrates performance with respect to scalability.

TABLE 6

Average time different hardware configurations.

| | Average Time to Compute Inner Product (Seconds) | | | |
|---|---|---|---|---|
| Dataset | Horizontal | | | |
| Size in $1024^2$ | AMD-1 GB | P4-2 GB | SGI Altix 12 × 4 GB | Vertical AMD-1 GB |
| 1 | 0.55 | 0.46 | 1.37 | 0.00008 |
| 2 | 1.10 | 0.91 | 2.08 | 0.00008 |
| 4 | 2.15 | 1.85 | 3.97 | 0.00010 |
| 8 | ⊗ | 3.79 | 8.48 | 0.00010 |
| 16 | ⊗ | ⊗ | 16.64 | 0.00010 |
| 24 | ⊗ | ⊗ | 28.80 | 0.00010 |

⊗: Out of memory

The average time running under different machines is graphed in FIG. 16. As FIG. 16 depicts, the horizontal approach is very sensitive to the available memory in the machine. For the vertical approach, it only requires 0.0001 seconds on average to complete the calculation on all data sets datasets, very much less than Horizontal approach. This significant improvement in computation time is due to the use of similar root count values, pre-computed P-trees creation. Although various vectors for different data points are fed during calculation the pre-computed root counts can be used repeatedly. This allows the pre-computation of these once and use of their values repeatedly regardless how many inner product calculations are computed as long as the dataset does not change. It should be noted that the vertical approach tends to have a constant execution time even though the dataset size is progressively expanded.

Table 7 provides data to rebut the assertion that pre-calculation of root count makes the above comparison fallacious. The time required for loading vertical data structure to memory and one time root count operations for vertical approach, and loading horizontal records to memory given on table 7. The performance with respect to time of the vertical approach is comparable to the horizontal approach. There is a slight increase for time required to load horizontal records than to load P-trees and to compute root counts as presented in table 160. This illustrates the ability of the P-tree data structure to efficiently load and compute the simple counts. These timing were tested on a P4 with 2 GB of memory.

TABLE 7

Time for computing root count and loading dataset.

| Dataset Size in 1024² (cardinality of the Dataset) | Time (Seconds) | |
|---|---|---|
| | Vertical (PSIPs) Root Count Pre-Computation and P-trees Loading | Horizontal (HSIPs) Horizontal Dataset Loading |
| 1 (1,048,576) | 3.900 | 4.974 |
| 2 (2,097,152) | 8.620 | 10.470 |
| 4 (4,194,304) | 18.690 | 19.914 |
| 8 (8,388,608) | 38.450 | 39.646 |

A second experiment was conducted using the first embodiment of the present invention to observe the algorithm's timing and scalability performance when executing on machines with different specifications, especially for HSIPs which are very sensitive to the availability of memory to execute successfully. That the HSIPs are sensitive to the availability of memory can be seen from the runs to compute HSIPs on AMD with 1 GB memory. HSIPs successfully completed the total variation computation using datasets with cardinality of 1,048,576, 2,097,152, and 4,194,304, yet suffered from out of memory problem when computing total variation using a dataset with cardinality of more than 4.1 million. Similarly, the computation of HSIPs on the P4·2 GB machine reinforces the fact that the HSIPs scale to compute total variation only for datasets with cardinality less than 8.3 million. HSIPs performed better in terms of scalability under the SGI Altix and successfully computed total variation for all datasets, but suffered from out of memory problem when trying to load a dataset with more than 25 million rows. However the timing performance of HSIPs on this machine degraded significantly in comparison to the timing of HSIPs running on the P4 2 GB RAM. This is because of underutilization of the full capability of the shared memory 12 processor parallel architecture of the machine, unlike the PSIPs which can be made to successfully take advantage of the shared memory architecture. This machine with 12×4 G of RAM was used in the performance study since it was the only machine capable of loading the entire data set for the HSIPs for larger data sets. On the other hand, the PSIP technique was successful in both timing and scalability. There were no memory problems even with the computation of the total variation with dataset having more than 25 million rows. As noted above, it was possible to compute PSIPs for the largest data set on the smallest machine (AMD.1 GB). The same result was also obtained when running PSIPs under the other two machines tabulated in table 6. The average time was around 0.0003 to 0.0004 seconds. FIG. 16 further illustrates performance with respect to scalability.

It is intended that the present invention cover modifications and variations of the present invention that are within the scope of the appended claims and their equivalents.

The invention claimed is:

1. In a system including a computer for performing a clustering analysis on a data set residing in a memory operably coupled to the computer, the data set represented as a relational table R of n tuples, each tuple having at least one numeric attribute and a class label of a class to which the tuple belongs, a computer implemented method comprising:
    converting each numeric attribute into a binary representation having b-bit positions;
    decomposing the dataset into a bit sequential format (bSQ) comprising b separate bit vectors, with one bit vector for each of the b-bit positions;
    constructing at least one basic Peano-Count tree (P-tree) $P_{ij}$ representing a P-tree for the $j^{th}$ bit vector of the $i^{th}$ attribute from the bSQ formatted dataset wherein the P-tree is obtained by:
        designating at a root node a root count (rc) representing the sum of 1-bits in the $j^{th}$ bit vector; and
        recursively partitioning the $j^{th}$ bit vector into subsets and recording the root count of 1-bit for each subset at a leaf node until a subset has all 0-bits or all 1-bits;
    obtaining at least one P-tree class mask PX comprising a vertical bit vector for each class X with bit 1 assigned to each tuple containing class X and bit 0 assigned to the tuple otherwise;
    defining a P-tree algebra having at least one logical AND (^) operator representing a resultant P-tree obtained by level-by-level ANDing of the corresponding nodes or leaves of a first P-tree with a second P-tree;
    using the P-tree algebra to formulate a Vertical Set Inner Product (VSIP) for a selected class X having vectors x∈X in R with P-tree class mask PX, with a target vector a∈R, the VSIP formulated according to a first relation $$X \cdot a = \sum_{x \in X} x \cdot a = \sum_{i=1}^{n} \sum_{j=b-1}^{0} rc(PX \wedge P_{ij}) \cdot \sum_{k=0}^{b-1} 2^{j+k} \cdot a_{ik}$$

where x and a are represented in b binary bits;
repeatedly performing until X is empty;
    selecting a point a∈X having a local density ρ, and computing a VSIP for all x∈X that lies within a disk of radius r centered about point a, wherein r is progressively increased until $r=r_{max}$, at which point a local density variation exceeds a predefined threshold value;
    defining a revised set, (X−x), that excludes all points x∈X that lie within disk of radius $r_{max}$ and having a local density substantially equal to the local density ρ about a; and
    tabulating the point a∈(X−x), the $r_{max}$, the local density ρ and the local density variation to generate a table T; and
sorting the table T on the VSIP to obtain a ranked set of centroids for use in the cluster analysis.

2. The method of claim 1 wherein the P-tree algebra is used to define a vertical set vector difference (X−a) defined as $$X-a=(v_1, v_2, \ldots, v_i, \ldots, v_n), 1 \leq i \leq n$$

with $$v_i = \sum_{j=b-1}^{0} 2^j \cdot (rc(PX \wedge P_{ij}) - rc(PX) \cdot a_{ij}).$$

3. The method of claim 2 wherein the P-tree algebra is used formulate the VSIP according to a second relation $$(X-a) \cdot (X-a) =$$
$$\sum_{i=1}^{n} \sum_{j=b-1}^{0} 2^{2j} \cdot rc(PX \wedge P_{ij}) + \sum_{\substack{k=(j*2) \ldots (j+1)\&\&j\neq 0 \\ l=(j-1) \ldots 0\&\&j\neq 0}} 2^k \cdot rc(PX \wedge P_{ij} \wedge P_{il}) +$$

-continued $$(2) \cdot \sum_{i=1}^{n} a_i \cdot \sum_{j=b-1}^{0} 2^j \cdot rc(PX \wedge P_{ij}) + rc(PX) \cdot \sum_{i=1}^{n} a_i^2.$$

4. The method of claim 3 wherein a measure of total variation of X about a is used for cluster analysis, the measure defined as $$\frac{(X-a)\cdot(X-a)}{N},$$

N refers to the total number of vectors in X.

5. The method of claim 3 wherein the computation of the VSIP includes the step of computing the root counts $$\sum_{i=1}^{n} \sum_{j=b-1}^{0} 2^{2j} \cdot rc(PX \wedge P_{ij}),$$

$$\sum_{\substack{k=(j*2)\ldots(j+1)\&\&j\neq 0 \\ l=(j-1)\ldots 0\&\&j\neq 0}} 2^k \cdot rc(PX \wedge P_{ij} \wedge P_{il}),$$

$$\sum_{j=b-1}^{0} 2^j \cdot rc(PX \wedge P_{ij})$$

and rc (PX) only once and reusing them as long as the dataset and the set of class X remain unchanged.

6. The method of claim 1, wherein the point a∈X is selected randomly.

7. The method of claim 1 wherein the tuple is a pixel and the attributes of the tuple are bands of a remotely sensed image (RSI).

8. The method of claim 1 wherein the sorting further comprises:
  selecting the points a∈X associated with the lower values of (X−a)∘(X−a) to compute a high-quality value for k, wherein k is a number of centroids in the ranked set; and
  associating the higher values of (X−a)∘(X−a) with outliers.

9. A computer-readable medium comprising computer-executable instructions for performing a reduction of the computation time in k-means data clustering operations over a data set wherein the data set is represented in a memory of a computer as a relational table R of n horizontal records, each record having at least one numeric attribute and a class label of a class to which the record belongs, the computer-executable instructions establishing a special-purpose machine for:
  a) decomposing the dataset into a bit sequential format (bSQ) comprising b separate bit vectors, one bit vector for each bit position in a b-bit binary representation of each numeric attribute in the dataset;
  b) generating a basic Peano-Count tree (P-tree) $P_{ij}$ for the $j^{th}$ bit vector of the $i^{th}$ attribute;
  c) obtaining at least one P-tree class mask $PX_i$ comprising a vertical bit vector for each class X with bit 1 assigned to each record containing that class X and bit 0 assigned to the record otherwise;
  d) selecting a class X having vectors x∈X in R with P-tree class mask PX applied thereto;
  e) selecting a point a∈X having a local density ρ;
  f) computing a vector set inner product of vector difference for all x∈X that lie within a disk of radius r centered about point a;
  g) computing a variation d between a local peripheral density near a circumference of the disk, and the local density ρ;
  h) if the variation d exceeds a predefined density threshold,
    h1) tabulating point a∈X, vector set inner product of vector difference, radius r, local density ρ and variation d to obtain a table T; and
    h2) pruning all points x∈X with local density substantially equal to ρ to obtain a revised set (X−x);
  i) repeating steps d) thru h) until X is empty;
  j) else, if the variation d is less than or equal to the predefined density threshold, increasing the radius r and repeating steps d) through h); and
  k) sorting the table T to rank the points a wherein at least one point a constitutes a high-quality value for the number of centroids k for a.

10. The computer medium of claim 9 wherein the P-tree algebra is used formulate the vector set inner product of vector difference according to $$(X-a)\cdot(X-a) =$$
$$\sum_{i=1}^{n} \sum_{j=b-1}^{0} 2^{2j} \cdot rc(PX \wedge P_{ij}) + \sum_{\substack{k=(j*2)\ldots(j+1)\&\&j\neq 0 \\ l=(j-1)\ldots 0\&\&j\neq 0}} 2^k \cdot rc(PX \wedge P_{ij} \wedge P_{il}) +$$
$$(2)\cdot\sum_{i=1}^{n} a_i \cdot \sum_{j=b-1}^{0} 2^j \cdot rc(PX \wedge P_{ij}) + rc(PX)\cdot\sum_{i=1}^{n} a_i^2.$$

11. The computer medium of claim 10 wherein the computation of the vector set inner product of vector difference includes the step of computing the root counts $$\sum_{i=1}^{n} \sum_{j=b-1}^{0} 2^{2j} \cdot rc(PX \wedge P_{ij}),$$

$$\sum_{\substack{k=(j*2)\ldots(j+1)\&\&j\neq 0 \\ l=(j-1)\ldots 0\&\&j\neq 0}} 2^k \cdot rc(PX \wedge P_{ij} \wedge P_{il}),$$

$$\sum_{j=b-1}^{0} 2^j \cdot rc(PX \wedge P_{ij}) \text{ and}$$

rc (PX) only once and reusing the root counts as long as the dataset and the set of class X remain unchanged.

12. A system for performing data mining in a dataset having a plurality of points, each point represented by a vector having a plurality of attributes, the system comprising:
  a computer system including data storage that stores the dataset and a processor interfaced with the data storage, the computer system being programmed to determine a measure of variation of a set of points of the dataset about a first target data point, wherein:
    the set of points of the dataset, being initially arranged such that each point of the set of points includes a plurality of bits, with each bit being in a corresponding one of a plurality of bit positions, is represented by a plurality of vertical bit vectors, each bit vector corresponding to a different one of the plurality of bit positions and including bits of the set of points of the dataset having that bit position, and each of the plurality of vertical bit vectors is represented by a corresponding at least one compressed data object;

the plurality of compressed data objects is processed to compute a first valuation set of at least one predefined logical relationship among certain attributes of the set of points of the dataset; and the first target data point is processed to compute a second valuation set of at least one predefined logical relationship between the first target data point and the first valuation set, wherein the at least one predefined logical relationship of the second valuation set includes at least one logical relationship selected from the group consisting of: an inner product of the set of points of the dataset and the first target data point, a set vector difference that represents a sum of a sum of differences from the set of points to the first target data point, or a total variation of the set of points about the first target data point.

13. The system of claim 12, wherein the at least one predefined logical relationship of the first valuation set includes a logical combination of certain attributes of each point of the set of points to produce a point-specific logical result for that point; and wherein the first valuation set includes a vertical aggregation of the point-specific logical results for each vertical bit vector.

14. The system of claim 13, wherein the point-specific logical result for each point is a result of an application of a mask attribute to at least one other attribute for that point; and wherein the vertical aggregation produces a root count corresponding to each vertical bit vector.

15. The system of claim 12, wherein the at least one predefined logical relationship of the second valuation set represents a degree of similarity between the first target data point and a statistical summary of the set of points of the dataset.

16. The system of claim 12, wherein the first valuation set is pre-computed and stored in the data storage prior to computation of the second valuation set; and wherein a second target data point is processed to compute a third valuation set of at least one predefined logical relationship between the second target data point and the pre-computed first valuation set.

17. A method for performing data mining in a dataset having a plurality of points, each point represented by a vector having a plurality of attributes, the method comprising:

determining a measure of variation of a set of points of the dataset about a first target data point, including:

representing the set of points of the dataset, being initially arranged such that each point of the set of points includes a plurality of bits, with each bit being in a corresponding one of a plurality of bit positions, by a plurality of vertical bit vectors, each bit vector corresponding to a different one of the plurality of bit positions and including bits of the set of points of the dataset having that bit position;

representing each of the plurality of vertical bit vectors by a corresponding at least one compressed data object;

processing the plurality of compressed data objects to compute a first valuation set of at least one predefined logical relationship among certain attributes of the set of points of the dataset; and processing the first target data point to compute a second valuation set of at least one predefined logical relationship between the first target data point and the first valuation set, wherein the at least one predefined logical relationship of the second valuation set includes at least one logical relationship selected from the group consisting of: an inner product of the set of points of the dataset and the first target data point, a set vector difference that represents a sum of a sum of differences from the set of points to the first target data point, or a total variation of the set of points about the first target data point.

18. The method of claim 17, wherein the processing of the plurality of compressed data objects to compute the first valuation set includes computing a logical combination of certain attributes of each point of the set of points to produce a point-specific logical result for that point;

wherein the processing to compute the first valuation includes producing a vertical aggregation of the point-specific logical results for each vertical bit vector; and wherein the processing to compute the second valuation set of the at least one predefined logical relationship produces a measure indicating a degree of similarity between the first target data point and a statistical summary of the set of points of the dataset.

\* \* \* \* \*

UNITED STATES PATENT AND TRADEMARK OFFICE
CERTIFICATE OF CORRECTION

PATENT NO. : 7,836,090 B2
APPLICATION NO. : 11/791004
DATED : November 16, 2010
INVENTOR(S) : Perrizo et al.

It is certified that error appears in the above-identified patent and that said Letters Patent is hereby corrected as shown below:

*Column 1, line 15 should read*:

~~This work may have been funded at least in part by GSA Grant No. ACT#K96130308, which may entitle the U.S. government to certain rights to the invention.~~ This invention was made with government support under GSA Grant No. ACT#K96130308, awarded by the U.S. government. The government has certain rights in the invention.

Signed and Sealed this
Fifteenth Day of March, 2011

David J. Kappos
*Director of the United States Patent and Trademark Office*